(12) United States Patent
Amatucci

(10) Patent No.: US 6,383,682 B1
(45) Date of Patent: May 7, 2002

(54) YTTRIUM-ION RECHARGEABLE BATTERY CELLS

(75) Inventor: Glenn G. Amatucci, East Brunswick, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/544,887

(22) Filed: Apr. 7, 2000

(51) Int. Cl.$^7$ .............................................. H01M 10/40
(52) U.S. Cl. ...................... 429/188; 429/344; 429/218.1
(58) Field of Search .............................. 429/344, 218.1, 429/231.5, 188

(56) References Cited

U.S. PATENT DOCUMENTS

| 4,098,669 | A | * | 7/1978 | De Nora et al. ............. 204/252 |
| 5,470,672 | A | * | 11/1995 | Naoumidis ................... 429/40 |

* cited by examiner

*Primary Examiner*—Gabrielle Brouillette
*Assistant Examiner*—M. Wills
(74) *Attorney, Agent, or Firm*—David A. Hey

(57) ABSTRACT

A rechargeable yttrium-ion battery cell comprising a source of yttrium ions, an electrolyte providing ion mobility, and an electrode material capable of reversibly accepting and yielding yttrium ions exhibits substantially increased specific capacity due to the activity of multivalent yttrium ions.

12 Claims, 2 Drawing Sheets

YTTRIUM-ION RECHARGEABLE BATTERY CELLS

BACKGROUND OF THE INVENTION

The present invention relates to rechargeable battery cells of high electrochemical charge capacity and, particularly, to such battery cells which function by reversible intercalation/deintercalation or other interchange of multivalent yttrium ions between cell electrodes.

Commercially successful rechargeable ion intercalation batteries have been based in great measure upon lithium wherein the negative cell electrode provides a source of lithium ions and comprises lithium metal, a lithium alloy, or, when the cell is in the charged state, a lithium-intercalated material, such as carbon. A combination of such lithium ion source electrodes with positive cell electrode materials capable of intercalating lithium ions, and suitable electrolytes and ion-transmissive, electron-insulative interelectrode separator materials comprises a stable electrochemical cell which may be continually recycled between charged and discharged states to store and yield electrical energy for myriad electrical devices.

As simply viewed, the energy storage capability, or electrolytic capacity, of such cells is primarily dependent upon the numbers of ions, and thus the numbers of electron transfers, which can be derived from the available amount of active electrode materials for rechargeable cycling between cell electrodes. While a cell's capacity may, generally, be increased simply by increasing the amount of active electrode material, practical cell weight limitations determine the feasibility of such an approach. Thus, the extensive use of lithium in rechargeable-battery cells reflects the low molecular weight of that material which enables the incorporation of considerable amounts of active ion source while maintaining the advantageously low weight of a resulting battery. A detraction from the desirability of lithium remains, however, in that the specific capacity, or the amount of electrical energy which may be stored and recovered from a given weight of active electrode material, is limited by the singular valence of lithium which yields only a single electron/ion transfer per unit weight of lithium.

Attempts have been made to increase the specific capacity of rechargeable battery cells by incorporating multivalent electrode ion source materials capable of yielding multiple electron/ion transfers per unit weight during electrolytic cycling of a cell. Investigations into the use of such materials are described in U.S. Pat. Nos. 5,601,949 and 5,670,275 which suggest the possible utility of alkaline earth and lanthanide metal compounds as intercalatable ion sources. Unfortunately, however, such materials of reasonable unit weight are limited to those of bivalent alkaline earth ions, such as calcium, magnesium, and strontium. The mentioned exotic trivalent lanthanide compound sources, such as lanthanum, europium, and samarium, not only lack practical availability, but they exhibit such high molecular weights that any specific capacity advantage anticipated due to trivalent ions is all but lost as the result of the increase in cell weight due to the heavier incorporated active electrode materials.

As a result of the present invention, on the other hand, the discovery of the utility of yttrium compounds as suitable active electrode materials for rechargeable battery cells provides such materials in a practical weight range which yield trivalent ions and extraordinarily increase the specific capacity of resulting battery cells.

SUMMARY OF THE INVENTION

In the investigations underlying the present invention, it has been found that, contrary to the expectation of a limited ability to diffuse and intercalate, alloy, or otherwise physically site into known receptor electrode materials due to the high charge density and normally strong intrastructural bonding of the relatively small trivalent yttrium ion, such ions are indeed capable of reversible insertion or intercalation with a number of metal oxide and sulfide receptor electrodes to a degree sufficient to support a practical, high capacity rechargeable electrolytic battery cell.

When combined in the usual manner with an ion receptor counter-electrode material and an electrolyte, e.g., a solution of a dissociable yttrium compound in a non-aqueous solvent, an yttrium-ion source electrode material comprises an electrolytic battery cell with a specific capacity in the range of up to about 250 to 350 mAh/g which may be repeatedly cycled between charged and discharged states to yield stable electrical current over a range of about 2 V. The structure of such battery cells may follow the mechanical style wherein layers of an ion source electrode material, such as yttrium metal, and receptor electrode material, such as a vanadium oxide, are compressively assembled with an interposed separator layer of an electroninsulating, ion-transmissive material, such as a borosilicate glass paper or a porous polyolefin membrane, typically saturated with a fluid electrolyte, such as a 1 M solution of yttrium perchlorate in an equipart mixture of ethylene carbonate and dimethyl carbonate. A commercially available Swagelok test cell is typical of such a mechanical structure and provides a simple apparatus for investigating the efficacy of proposed battery cell components and compositions.

A more commercially adapted and preferred cell fabrication comprises electrode and separator layers of active electrode compounds and electrolyte dispersed in polymeric matrix compositions which enable the lamination of those layers into a unitary, flexible electrolytic battery cell sheet, such as described in U.S. Pat. No. 5,460,904.

Ion receptor positive electrode materials which may be effectively employed in the present invention to achieve the noted improvements over prior electrolytic cells include, preferably in nano-material form, i.e., in a particle size less than about 500 nm, transition metal oxides and sulfides such as vanadates, e.g., $V_2O_5$, $V_6O_{13}$, or $VO_2$, chromates, e.g., $Cr_3O_8$, molybdates, e.g., $MoO_3$, tungstates, e.g., $WO_3$, titanium disulfide , and yttrium silicide, which latter material may be utilized, as well, in negative ion-source electrodes with an appropriate positive electrode comprising, for example, $V_2O_5$. Alternative negative electrode materials include yttrium metal and alloys, such as yttrium aluminide, and yttrium carbide.

Commonly-employed ion-transmissive separator membranes or sheet materials, such as glass fiber mats, polyolefin membranes, and cast polymer and copolymer films, e.g., (poly)vinylidene fluoride hexafluoropropylene, serve equally well in the fabrication of rechargeable yttrium-ion battery cells of the present invention. Useful cell electrolytes likewise comprise compositions providing primary ion, i.e., yttrium, mobility. Such components are thus incorporated as 0.5 M to 2 M solutions of yttrium compound, such as yttrium trifluoromethane sulfonate, yttrium perchlorate, yttrium hexafluorophosphate, yttrium hexafluoropentanedionate, and yttrium hexafluoroborate, alone or in combination, dissolved in such proven stable electrolyte solvents as ethylene carbonate, dimethyl carbonate, vinylene carbonate, dimethyl ethoxide, tetrahydrofuran, propylene carbonate, and mixtures thereof.

BRIEF DESCRIPTION OF THE DRAWING

The present invention will be described with reference to the accompanying drawing of which.

DESCRIPTION OF THE INVENTION

Figure 1:
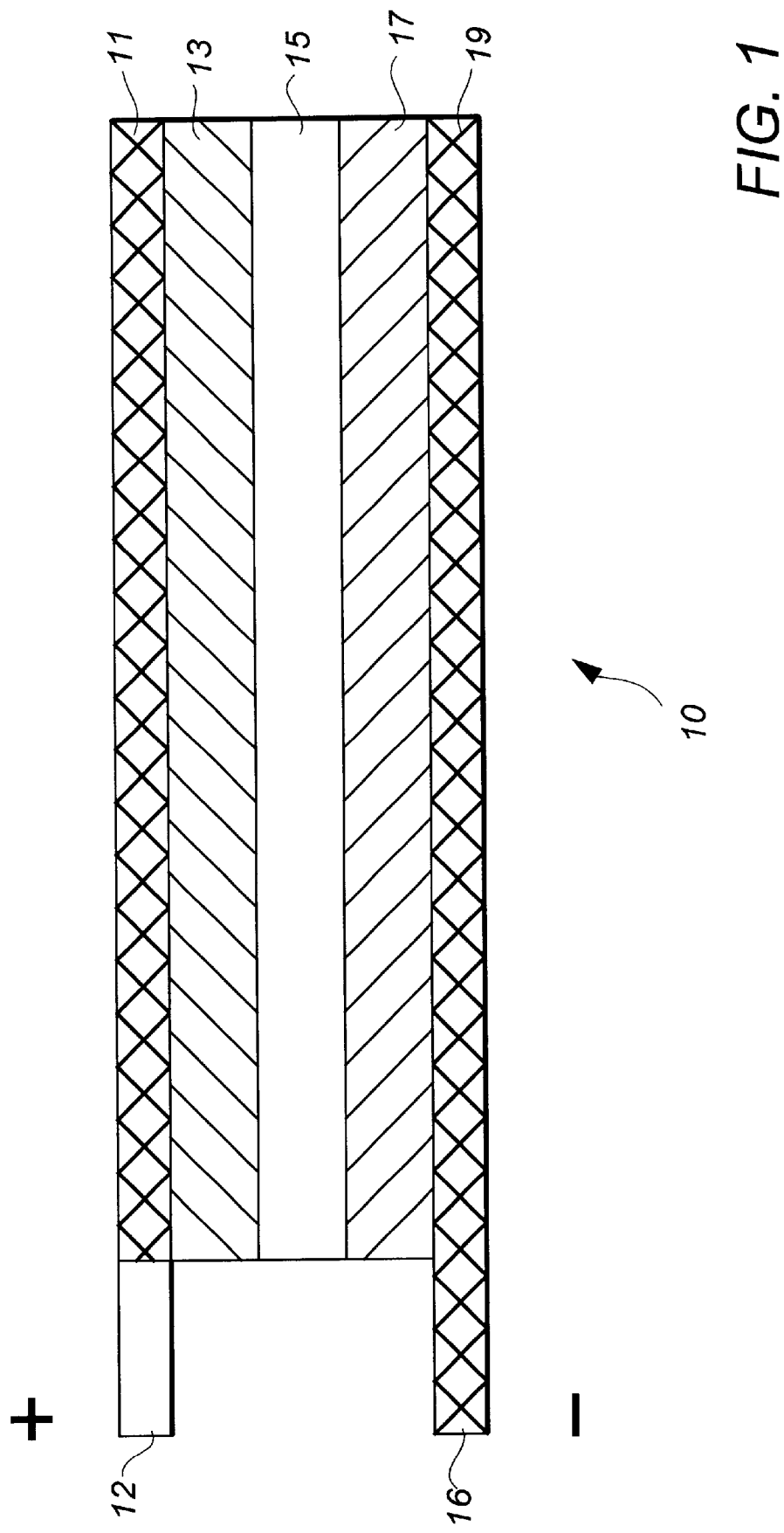
FIG. 1 is a diagrammatic representation of a laminated battery cell structure useful for embodying materials of the present invention.

A typical unitary laminated layer battery cell structure preferably employed to embody the present invention is depicted at 10 in FIG. 1 and comprises a positive electrode layer 13, a negative electrode layer 17, and an interposed separator/ electrolyte layer 15. As described in earlier-mentioned U.S. Pat. No. 5,460,904, layers 13, 17 initially comprise respective active electrode materials dispersed in a plasticized polymer matrix while layer 15 comprises such a polymer matrix alone. Subsequent to lamination, usually with metallic grid current collector layers 11, 19, which may include tabs 12, 16 for use as battery terminals, the assemblage is contacted with a selected solvent and/or electrolyte solution in order to activate the battery cell for use by substantially replacing the polymer matrix plasticizer with electrolyte.

The following are representative examples of laminated layer battery structures embodying the rechargeable yttrium-ion cells of the present invention.

EXAMPLE I

A separator/electrolyte membrane coating solution is prepared by suspending 30 parts by weight of an 88:12 vinylidene fluoride (VdF):hexafluoropropylene (HFP) copolymer of about $380 \times 10^3$ MW (Kynar FLEX 2801, Atochem) and 20 parts silanized fumed silica in about 200 parts acetone and adding to this mixture about 40 parts dibutyl phthalate (DBP) plasticizer. The completed mixture is warmed to about 50° C. to facilitate dissolution of the copolymer and is homogenized in a laboratory ball mill for about 6 hr. A portion of the resulting slurry is coated on a glass plate with a doctor blade device gapped at about 0.5 mm. The acetone coating vehicle is allowed to evaporate within the coating enclosure under moderately flowing dry air at room temperature for about 10 min to yield a tough, flexible, plasticized film which is stripped from the glass plate. The film is about 0.1 mm thick and is easily cut into rectangular separator elements.

EXAMPLE II

A negative electrode composition is prepared by homogenizing in a lid-covered stainless steel blender for about 10 min at 2500 rpm a mixture of 65 parts by weight of finely-divided yttrium silicide, 10 parts VdF:HFP copolymer (FLEX 2801) of Example I, 18.5 parts dibutyl phthalate, 6.5 parts conductive carbon (Super-P Black, MMM Carbon, Belgium), and about 100 parts acetone. The resulting slurry is degassed by briefly applying a reduced pressure to the mixing vessel, and a portion is then coated on a glass plate with a doctor blade device gapped at about 0.4 mm. The coated layer is allowed to dry within the coating enclosure under moderately flowing dry air at room temperature for about 10 min to yield a tough, flexible film which is stripped from the glass plate. The film, comprising about 65% by weight of particulate active yttrium-ion source material, is about 0.12 mm thick and is easily cut into rectangular electrode elements.

EXAMPLE III

A positive electrode composition is prepared by homogenizing in a lid-covered stainless steel blender for about 10 min at 2500 rpm a mixture of 65 parts by weight vanadium pentoxide, 10 parts VdF:HFP copolymer (FLEX 2801) of Example I, 18.5 parts dibutyl phthalate, 6.5 parts Super-P conductive carbon, and about 100 parts acetone. The resulting slurry is degassed, and a portion is then coated on a glass plate with a doctor blade device gapped at about 0.5 mm. The coated layer is allowed to dry within the coating enclosure under moderately flowing dry air at room temperature for about 10 min to yield a tough, flexible film which is readily stripped from the glass plate. The film, comprising about 65% by weight of particulate $V_2O_5$ intercalation material, is about 0.15 mm thick and is easily cut into rectangular electrode elements.

EXAMPLE IV

A battery cell 10 as depicted in FIG. 1 is prepared in the following manner. Respective positive and negative current collectors in the form of rectangular open stainless steel grids 11, 19 of about 30 $\mu$m thickness (e.g., MicroGrid precision expanded foil, Delker Corp.)are trimmed at one end to form tabs 12, 16 which will subsequently serve as convenient battery terminals. Collectors 11, 19 are assembled as shown in FIG. 1 with sections of the electrode and separator films of Examples 1–3 and are laminated in a commercial card laminator at about 120° C. The unitary laminated cell is then immersed in diethyl ether for several minutes to extract dibutyl phthalate plasticizer from the polymer layer matrix and the laminate is then immersed in a 1 M electrolyte solution of $Y(ClO_4)_3$ in a 2:1 mixture of ethylene carbonate:dimethyl carbonate to saturate the laminate matrix and activate the battery cell. The cell is then sealed, but for the extending terminal tabs 12, 16, in a polyolefin envelope (not shown) prior to testing.

Figure 2:
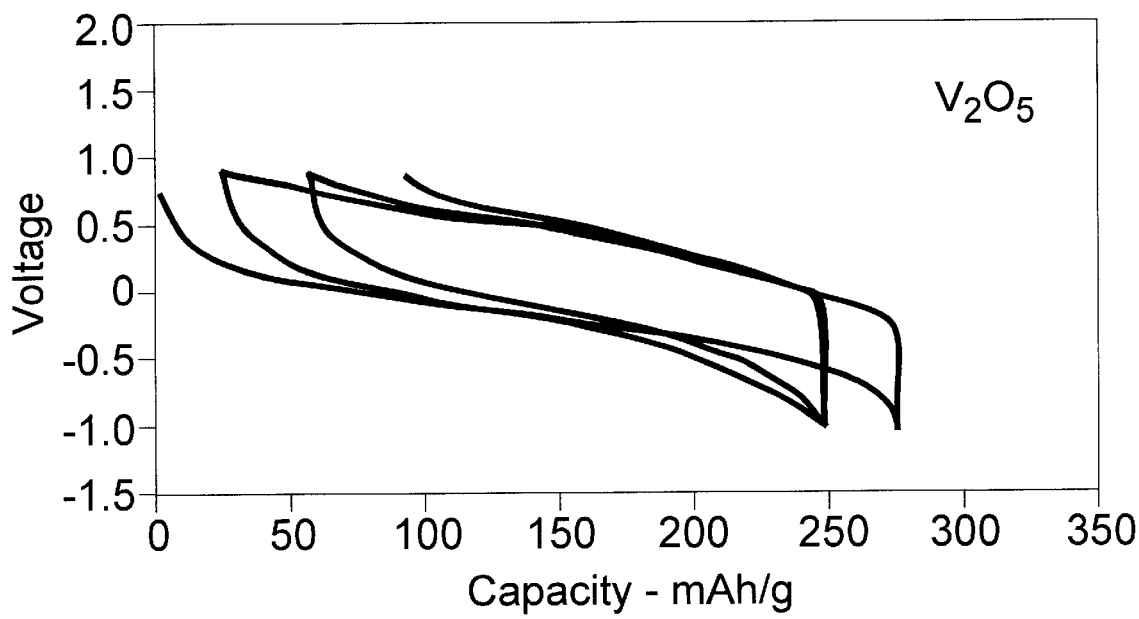
FIG. 2 is a graph tracing recycling voltage as a function of specific capacity in an yttrium-ion cell of the present invention comprising a $V_2O_5$ positive electrode.

A battery cell prepared as in the foregoing examples and tested under constant current cycling yields results shown in FIG. 2. Despite the rudimentary, non-optimized compositions employed in its fabrication, this cell exhibits a capacity which exceeds a popular lithium-ion cell by about 50%.

EXAMPLE V

Figure 3:
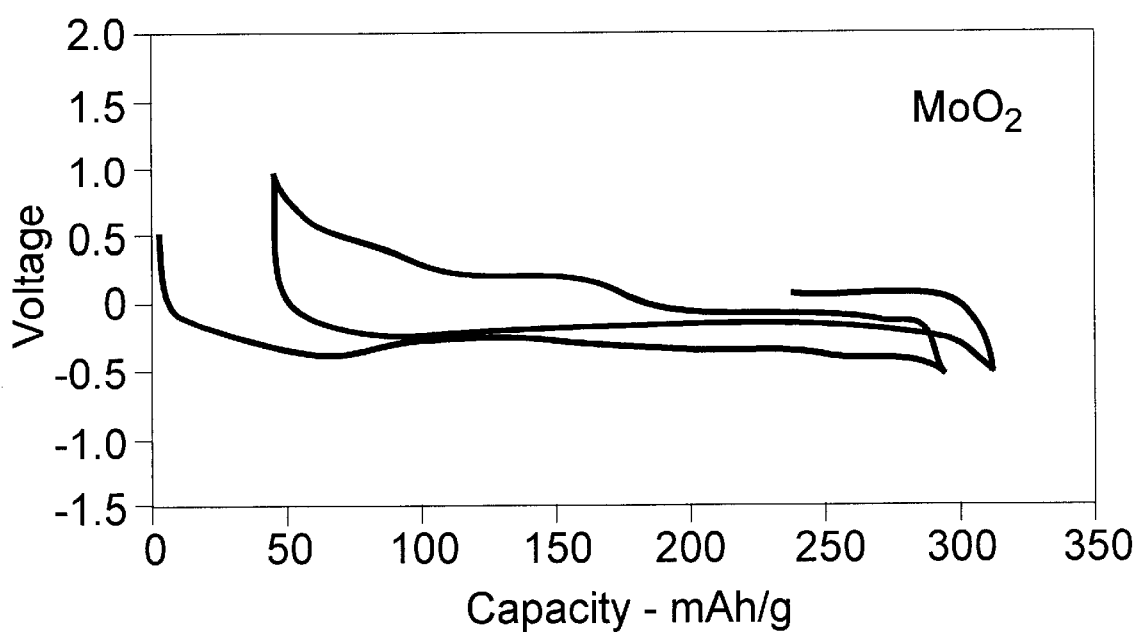
FIG. 3 is a graph tracing recycling voltage as a function of specific capacity in an yttrium-ion cell of the present invention comprising a $MoO_2$ positive electrode.

A battery cell is prepared in the manner of Examples I–IV with the exception that yttrium aluminide is substituted for the yttrium silicide negative electrode material of Example II, molybdenum oxide is substituted for the vanadium oxide positive electrode material of Example III, and yttrium trifluoro methanesulfonate is substituted for the yttrium perchlorate electrolyte of Example IV. Charge/discharge cycle testing yields capacity results shown in FIG. 3.

EXAMPLE VI

A battery cell prepared in the manner of Example V with respective substitutions of yttrium metal, tungsten oxide, and yttrium hexafluoropentanedione electrolyte yields comparable charge/discharge cycle testing capacity results.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. A rechargeable battery cell comprising:
   a negative electrode;
   a positive electrode;
   a separator disposed between said negative electrode and said positive electrode; and
   an electrolyte providing a source of yttrium ions;
   wherein at least one of said negative electrode and said positive electrode comprises an active material capable of reversibly accepting and yielding said yttrium ions.

2. A rechargeable battery cell according to claim 1, wherein said active material is selected from the group consisting of transition metal oxides and sulfides.

3. A rechargeable battery cell according to claim 2, wherein said active material is selected from the group consisting of vanadates, chromates, molybdates, and tungstates.

4. A rechargeable battery cell according to claim 3, wherein said active material is selected from the group consisting of $V_2O_5$, $V_6O_{13}$, $VO_2$, $Cr_3O_8$, $MoO_3$, and $WO_3$.

5. A rechargeable battery cell according to claim 2, wherein said active material is titanium disulfide.

6. A rechargeable battery cell according to claim 1, wherein said active material is selected from the group consisting of yttrium metal, yttrium silicide, yttrium aluminide, and yttrium carbide.

7. A rechargeable battery cell according to claim 1, wherein said electrolyte is selected from the group consisting of yttrium trifluoromethanesulfonate, yttrium perchlorate, yttrium hexafluorophosphate, yttrium hexafluoropentanedionate, and yttrium hexafluoroborate.

8. A rechargeable battery cell according to claim 1, wherein said negative electrode comprises yttrium silicide, said positive electrode comprises vanadium pentoxide, and said electrolyte comprises yttrium perchlorate.

9. A rechargeable battery cell according to claim 1, wherein said negative electrode comprises yttrium aluminide, said positive electrode comprises molybdenum oxide, and said electrolyte comprises yttrium trifluoromethanesulfonate.

10. A rechargeable battery cell according to claim 1, wherein said negative electrode comprises yttrium metal, said positive electrode comprises tungsten oxide, and said electrolyte comprises yttrium hexafluoropentanedione.

11. A rechargeable battery cell according to claim 1, wherein said active electrode material is a nano-material.

12. A rechargeable battery cell according to claim 11, wherein said nano-material has a particle size of about 500 nm.

* * * * *